Dec. 19, 1939.  J. R. SCHWARTZ  2,183,624
LAMINATED BITE WAFER
Filed June 10, 1938
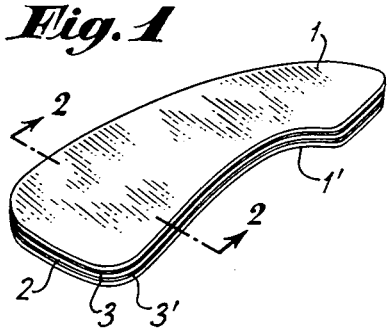
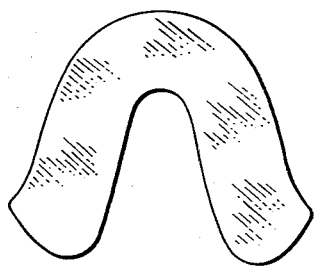
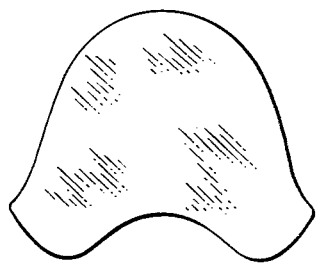
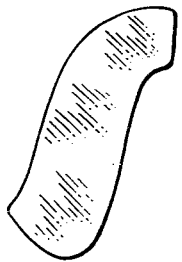
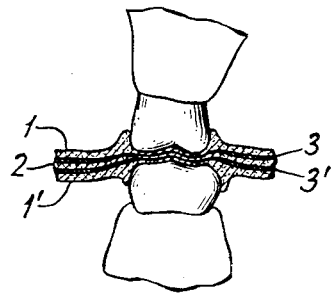
INVENTOR.
JACOB R. SCHWARTZ
BY Abraham S. Greenberg
ATTORNEY.

Patented Dec. 19, 1939

2,183,624

UNITED STATES PATENT OFFICE 2,183,624

LAMINATED BITE WAFER

Jacob R. Schwartz, Brooklyn, N. Y.

Application June 10, 1938, Serial No. 212,936

2 Claims. (Cl. 32—19)

My present invention relates to dental bite wafers, and more particularly to laminated wafers for obtaining precise occlusal registers.

One of the main objects of my present invention is to provide a laminated occlusal bite wafer which is constructed so as to provide a clean, sharp and accurate bite, or occlusal register, whereby the formed wafer readily lends itself as a key for precision registration of models in a dental articulator.

Another important object of my invention may be stated to reside in the provision of an occlusal bite wafer which comprises alternate layers of soft and hard wax separated by thin layers of a material capable of stretching and conforming to the biting characteristics and yet being highly resistant to piercing by sharp cusps of teeth.

Another object of my invention is to provide a method of fabricating a wax bite register wherein a plurality of wax layers, separated by Cellophane sheets, are caused to adhere by heat and pressure, and wafers of predetermined shapes are stamped out of the adhering layers; such wafers being characterized by the ability to conform readily to the object impressed therein.

Another object of my invention is to provide an especially prepared laminated wax bite form with interposed sustained films to assure definite occlusal register; the outer layers of the form giving sharp incisal and occlusal impressions; the middle layer being of a harder substance to function as a resistance; and the interposed films keeping the waxes together, preventing them from squashing apart, and yielding with the wax during the biting stress thereby preventing piercing and tearing of the form.

Still other objects of my invention are to improve generally the simplicity and efficiency of wax bite registers, and more especially to provide laminated wax bite wafers which are not only reliable and durable in usage, but are additionally economical to manufacture.

The novel features which I believe to be characteristic of my invention are set forth in particularity in the appended claims. The invention itself, however, both as to its construction and mode of usage, will best be understood by reference to the following description, taken in connection with the drawing, in which I have indicated a preferred embodiment whereby my invention may be carried into effect.

In the drawing:

Fig. 1 shows a plan view in perspective of a laminated bite wafer embodying the invention, Fig. 2 is a magnified view of a section taken along line 2—2 of Fig. 1 looking in the direction of the arrows, Figs. 3, 4 and 5 show plan views of wafers with modified forms, Fig. 6 shows the sectional appearance of a wafer during the biting thereof.

Referring now to the accompanying drawing, wherein like reference characters in the different figures denote similar elements, it will be observed from Figs. 1 and 2 that a wafer generally 10 comprises alternate layers of soft and hard wax. The outer layers 1 and 1' are composed of a soft wax composition. The latter can be of any desired type, it is essential, however, that it be sufficiently soft so that the layers 1—1' will conform readily to the object imposed on them, or pressed into them. Such soft wax layers can be compounded, for example, of beeswax and paraffine in grades and proportions to be sufficiently soft. The middle, or intermediate, layer 2 is composed of a relatively harder wax composition. It can be compounded chiefly of beeswax and paraffine of such grades and proportions, as well as other ingredients such as ceresin or carnauba waxes, to impart a desired degree of hardness to the layer. The layer 2 functions as a resistant material to prevent squashing or squeegeeing. Between adjacent faces of each pair of wax layers is disposed a thin sheet, or film, of material capable of adhering to the wax faces thereby holding the wax layers together. The films are adapted to stretch with the stretching and shaping of the wax layers, and prevent the piercing through of the wax layers by any sharp cusps of the biting teeth. It is essential to prevent piercing of the wax layers, because otherwise the occlusal register would be destroyed or be inaccurate.

Specifically there may be employed for the non-waxy layers 3—3' thin sheets of cellulose material, such as Cellophane. As an alternative, there may be employed in place thereof a strong, wax tissue paper; or a fine acetate cloth material of very thin texture. The fibrous material will insure stretching and conforming to the biting characteristics. The wafers, in finished form, may assume any of the shapes shown in Figs. 1, 3, 4 and 5. It is to be clearly understood that the specific configuration of each wafer is determined by the use required thereof. In general, it can be stated that the wafers will conform to the dimensions of either full, partial, half or sectional form consistent in size suitable to a patient's mouth.

In Fig. 6 I have shown in a purely qualitative manner the fashion in which the soft wax layers 1—1' conform to the tooth crown and form a cupping definitely positioning each tooth engaged. The intermediate layer 2 provides a resistant core, or base, to prevent squashing. The wax layers are securely retained to function as a unit because of the cellophane spacer films which firmly adhere to the wax faces. Repeated tests and practical application of this bite wafer have shown it to provide an accurate means whereby models of the jaw can be accurately registered while being placed on the instrument known as a dental articulator.

To fabricate a wafer, a thin sheet, or film, of Cellophane, preferably of a thickness of the order of 0.001 inch, is placed in contact with a face of a soft wax sheet. A heated press can be utilized to cause satisfactory adhesion of the Cellophane film. Subsequently a layer of hard wax is caused to adhere to the free face of the Cellophane sheet by heat and pressure. A second sheet of Cellophane is then caused to adhere to the free face of the middle wax layer by the same means. The remaining soft wax layer is then caused to adhere to the second Cellophane sheet by means of pressure and heat. The alternate layers of wax and Cellophane are now ready to be acted upon by specially designed mold cutters. The various shapes shown in Figs. 1, 3, 4 and 5, as well as others, are stamped out by the cutters. Wafers produced in this manner prevent biting or tearing apart when in actual use; the resulting bite is clean, sharp and accurate. Extreme biting pressure will be resisted by the wax binding layers 3—3'.

Because of adverse climatic conditions, it often becomes necessary to provide adequate adhesion of the respective layers of the bite wafer. In those instances, where heat and pressure are insufficient to cause proper and reliable adhesion, an adhesive medium may be resorted to. Such a medium can include gum arabic, gum acacia, gum tragacanth or gum althea. In general such a binder, when applied to the contacting faces of the various wafer layers, will not in any way interfere with the elastic quality of the bite wafer.

While I have indicated and described one wafer construction for carrying my invention into effect, it will be apparent to those skilled in the dental art that my invention is by no means limited to the particular wafer shown and described, but that many modifications may be made without departing from the scope of my invention as set forth in the appended claims.

What I claim is:

1. An occlusal bite wafer, having a shape readily adapted to fit into the mouth, comprising a pair of soft wax layers, a layer of relatively harder wax disposed between said pair of layers, a sheet of Cellophane adhering to the adjacent faces of each pair of soft and hard wax layers thereby binding the three layers into a single body adapted to be bitten without piercing of any of said layers or Cellophane sheets.

2. An occlusal bite wafer, having a shape readily adapted to fit into the mouth, comprising a pair of soft wax layers, a layer of relatively harder wax disposed between said pair of layers, a sheet of Cellophane adhering to the adjacent faces of each pair of soft and hard wax layers by virtue of an adhesive binder thereby binding the three layers into a single body adapted to be bitten without piercing of any of said layers or Cellophane sheets.

JACOB R. SCHWARTZ.